US006480899B1

United States Patent
Seddigh et al.

(10) Patent No.: US 6,480,899 B1
(45) Date of Patent: Nov. 12, 2002

(54) DIFFERENTIATED SERVICES IP QUALITY OF SERVICES ROUND TRIP TIME AWARE INTELLIGENT TRAFFIC CONDITIONER IN AN INGRESS NODE OF VIRTUAL PRIVATE NETWORKS

(75) Inventors: Nabil N. Seddigh, Ottawa (CA); Biswajit B. Nandy, Ottawa (CA); Peter S. Pieda, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/391,418

(22) Filed: Sep. 8, 1999

(51) Int. Cl.$^7$ .............................................. G06F 15/173
(52) U.S. Cl. ....................................... 709/240; 709/242
(58) Field of Search ................................ 709/232, 233, 709/234, 235, 240, 242; 320/229, 231, 232, 235

(56) References Cited

PUBLICATIONS

Blake, S. et al., "An Architecture for Differentiated Services", RFC 2475, Dec. 1998.
Heinanen J., Baker F., Weiss W., and Wroclawski J., "Assured Forwarding PHB Group", Internet Draft, Feb. 1999.
Floyd S., and Jacobson V., "Random Early Detection gateways for Congestion Avoidance", IEEE/ACM Transactions on Networking, V.1 N.4, Aug. 1993, pp. 397–413.
Clark D., and Fang W., "Explicit Allocation of Best Effort Packet Delivery Service", 1998.
Nandy B., Seddigh N, Pieda P., "Diffserv's Assured Forwarding PHB: What Assurance does the Customer Have?", submitted for publication, Apr. 1999.
Seddigh N., Nandy B., Pieda P., "Bandwidth Assurance Issues for TCP flows in a Differentiated Services Network", submitted for publication, Mar. 1999.
Fei A, Pei G, Liu R and Zhang L, "Measurements on Delay and Hop–Count of the Internet", Department of Computer Science, University of California.
Ikjun Yeom and A.L. Narasimha Reddy, "Marking for QoS Improvement", Department of Electrical Engineering, Texas A & M University.

Primary Examiner—Le Hien Luu

(57) ABSTRACT

A traffic conditioner is disclosed for use in a source edge device or ingress node in a carrier network. The carrier network includes: a plurality of virtual private networks, each virtual private network comprising a plurality of edge devices; and at least one core device for routing data between edge devices within the virtual private networks. Each plurality of edge devices includes: at least one source edge device; and at least one destination edge device or egress node associated with each source edge device. The carrier network also includes edge device communication means for determining the minimum aggregateRTT (minRTT) for the carrier network. The source edge device includes: means for measuring the rate of data flow (MeasuredRate) from the source edge device to each destination edge device associated therewith; means for calculating the round trip time (aggregateRTT) between the source edge device and each destination edge device associated therewith; and a predetermined target rate of data flow (TargetRate) between the source edge device and each destination edge device associated therewith. The traffic conditioner includes: in-marking means for marking a packet "in" if the MeasuredRate at the source edge device<= the TargetRate at the source edge device; and out-marking means for marking a packet "out" with probability of a function of ((MeasuredRate−TargetRate)/MeasuredRate)* ((minRTT/aggregateRTT)$^2$) if the MeasuredRate at the source edge device>the TargetRate at the source edge device.

24 Claims, 3 Drawing Sheets

US 6,480,899 B1

DIFFERENTIATED SERVICES IP QUALITY OF SERVICES ROUND TRIP TIME AWARE INTELLIGENT TRAFFIC CONDITIONER IN AN INGRESS NODE OF VIRTUAL PRIVATE NETWORKS

FIELD OF THE INVENTION

The present invention relates generally to traffic conditioners for use in networks. In particular, the present invention relates to differentiated services round trip time aware traffic conditioners for use in over provisioned networks.

BACKGROUND OF THE INVENTION

In the traditional IP network model, all user packets compete equally for network resources, particularly bandwidth. The rise in usage and popularity of the Internet coupled with new applications relating to voice, video and the World Wide Web has fuelled research to improve the Quality of Service delivered by best-effort networks. The underlying concept in IP Quality of Service (IP-QoS) is the ability of network operators to offer differing levels of treatment to user traffic based on their requirements.

Differentiated Services (Diffserv) Traffic Conditioners [Blake, S. et al, "An Architecture for Differentiated Services", RFC 2475, December 1998] use a scalable means to deliver IP-QoS based on the handling of traffic aggregates. Differentiated Services Traffic Conditioners operate on the premise that complicated functionality should be moved toward the edge of the network with very simple functionality at the core. Edge devices in this architecture are responsible for ensuring that individual user traffic conforms to traffic profiles specified by the network operator and for grouping flows in an aggregated fashion into a small number of classes. Core devices perform differentiated aggregate treatment of these classes based on the marking performed by the edge devices.

RIO-based [Clark D. and Fang W., "Explicit Allocation of Best Effort Packet Delivery Service", ACM Transactions on Networking, August 1998] schemes for Traffic Conditioners employ a have been proposed as a simple means of providing Differentiated Services. The basis of the RIO mechanism is RED-based [Floyd, S., and Jacobson, V., "Random Early Detection gateways for Congestion Avoidance", IEEE/ACM Transactions on Networking, V.1 N.4, August 1993, p. 397–413] differentiated dropping of packets during congestion at the router. In RIO, traffic profiles for end-users are maintained at the edge of the network. When user traffic exceeds the contracted target rate, their packets are marked out-of-profile. Otherwise, packets are marked in-profile. One known traffic conditioner used in this context marks packets "out" with probability:

$$p = \frac{(MeasuredRate - TargetRate)}{MeasuredRate}$$

Recent studies of RIO-based schemes [Nandy B, Seddigh N, Pieda P, "Diffserv's Assured Forwarding PHB: What Assurance does the Customer Have?", Presented at NOSSDAV 99, Boston, June 1999][Seddigh, N., Nandy B., Pieda, P., "Bandwidth Assurance Issues for TCP flows in a Differentiated Services Network", To be Presented at GLOCECOM 99, Rio de Janeiro, December 1999] indicate that in an over-provisioned network, target rates for all customers are achieved. However, excess bandwidth can be unfairly divided between equal-paying customers. This unfairness is caused by at least five different factors: Round Trip Time (RTT), packet size, size of target rate, number of microflows sharing target aggregate and presence of non-responsive flows. These same five factors also play a role in unfair degradation of service in under provisioned networks.

Thus, there is a need to mitigate the effect of the above five factors. The present invention is, in particular, directed to the need to mitigate the effect of RTT in dividing excess bandwidth among equal paying customers in an over provisioned network.

SUMMARY OF THE INVENTION

The present invention is directed to an RTT aware traffic conditioner (RTT-TC) for mitigating the effect of disparate RTTs in the distribution of excess bandwidth in over provisioned networks. The present invention is a traffic conditioner that accounts for varied RTTs on a network by marking lower RTT aggregates with a higher probability than higher RTT aggregates.

According to one aspect of the present invention, there is provided a traffic conditioner for use in a source edge device, i.e., an ingress node, in a carrier network. The carrier network includes: a plurality of virtual private networks, each virtual private network comprising a plurality of edge devices; and at least one core device for routing data between edge devices within the virtual private networks. Each plurality of edge devices includes: at least one source edge device; and at least one destination edge device, i.e., an egress node, associated with each source edge device. The carrier network also includes edge device communication means for determining the minimum aggregateRTT (minRTT) for the carrier network. The source edge device includes: means for estimating the rate of data flow (MeasuredRate) from the source edge device to each destination edge device associated therewith; means for estimating the round trip time (aggregateRTT) between the source edge device and each destination edge device associated therewith; and a memory element containing a predetermined target rate of data flow (TargetRate) between the source edge device and each destination edge device associated therewith. The traffic conditioner includes: in-marking means for marking a packet "in" if the MeasuredRate at the source edge device<=the TargetRate at the source edge device; and out-marking means for marking a packet "out" with probability of a function of $((MeasuredRate-TargetRate)/MeasuredRate)*((minRTT/aggregateRTT)^2)$ if the MeasuredRate at the source edge device>the TargetRate at the source edge device.

According to a further aspect of the present invention, there is provided a carrier network including: at least one virtual private network, each virtual private network including a plurality of edge devices; and at least one core device for routing data between edge devices within a virtual private network. Each plurality of edge devices includes: at least one source edge device; and at least one destination edge device associated with each source edge device. Each source edge device includes: a bandwidth estimator for estimating the rate of data flow (MeasuredRate) from the source edge device to each destination edge device associated therewith; a round trip time estimator for estimating the round trip time (aggregateRTT) between the source edge device and each destination edge device associated therewith; and a memory element containing a predetermined target rate of data flow (TargetRate) between the source edge device and each destination edge device associated therewith. The carrier network also includes an edge device communication mechanism for determining the minimum aggregateRTT (minRTT) for the carrier network. The carrier network also includes a traffic conditioner at each source edge device. The traffic conditioner includes: an in-marker for marking a packet "in" if the MeasuredRate at the source edge device<=the TargetRate at the source edge device; and an out-marker for marking a packet "out" with probability of a function of ((MeasuredRate−TargetRate)/MeasuredRate)* ((minRTT/aggregateRTT)$^2$) if the MeasuredRate at the source edge device>the TargetRate at the source edge device.

According to a further aspect of the present invention, there is provided a virtual private network for use in a carrier network. The carrier network includes at least one core device for routing data between edge devices on the carrier network, and edge device communication means for determining the minimum aggregateRTT (minRTT) for the carrier network. The virtual private network includes: at least one source edge device; at least one destination edge device associated with each source edge device; means at each source edge device for estimating the rate of data flow (MeasuredRate) from the source edge device to each destination edge device associated therewith; means at each source edge device for estimating the round trip time (aggregateRTT) between the source edge device and each destination edge device associated therewith; a memory element at each source edge device containing a predetermined target rate of data flow (TargetRate) between the source edge device and each destination edge device associated therewith. A traffic conditioner at each source edge device includes: in-marking means for marking a packet "in" if the MeasuredRate at the source edge device<=the TargetRate at the source edge device; and out-marking means for marking a packet "out" with probability of a function of ((MeasuredRate−TargetRate)/MeasuredRate)* ((minRTT/aggregateRTT)$^2$) if the MeasuredRate at the source edge device>the TargetRate at the source edge device.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the invention will now be described with reference to the accompanying drawings, in which.

DETAILED DESCRIPTION OF EMBODIMENTS OF THE INVENTION

Figure 1:
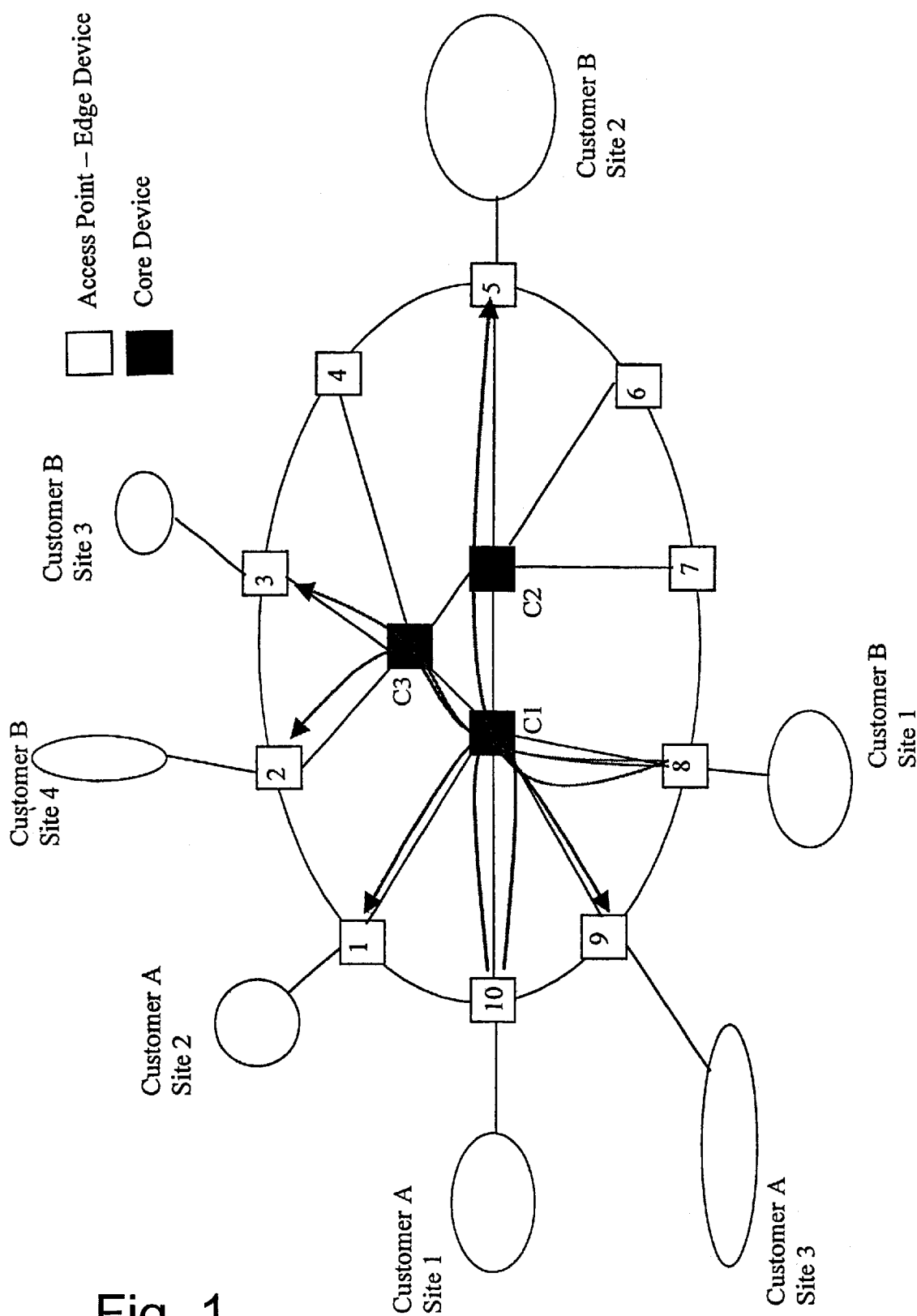
FIG. 1 illustrates a carrier network embodying an RTT-TC in accordance with the present invention.

FIG. 1 illustrates a carrier network. The carrier network includes two virtual private networks. Customer A's virtual private network includes edge devices #1, #9 and #10. Customer B's virtual private network includes edge devices #2, #3, #5 and #8. Edge devices #4, #6 and #7 are part of neither Customer A's nor Customer B's virtual private network. The carrier network includes three core devices C1, C2 and C3 for routing data between edge devices. In the illustrated embodiment, each edge device in each virtual private network is a source edge device, i.e., an ingress node. Each edge device in each virtual private network is also a destination edge device, i.e., an egress node. For example, the source-destination pairs in which edge device #3 is the source edge device are: #3 and #5; #3 and #8; #3 and #2. Thus, edge devices #5, #8 and #2 are the destination edge devices associated with source edge device #3.

Figure 2:
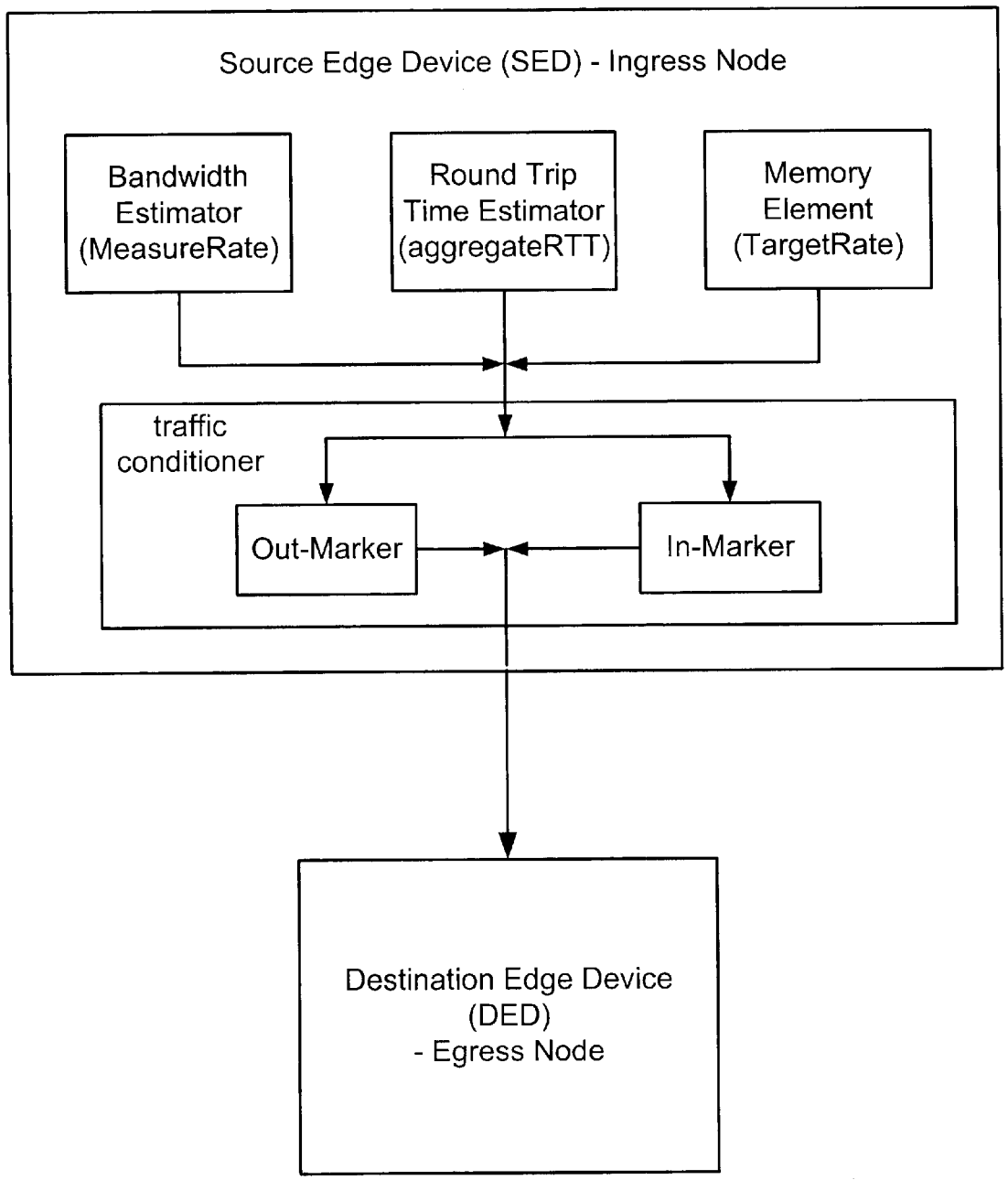
FIG. 2 is a block diagram of a source-destination pair in accordance with the present invention.
Figure 3:
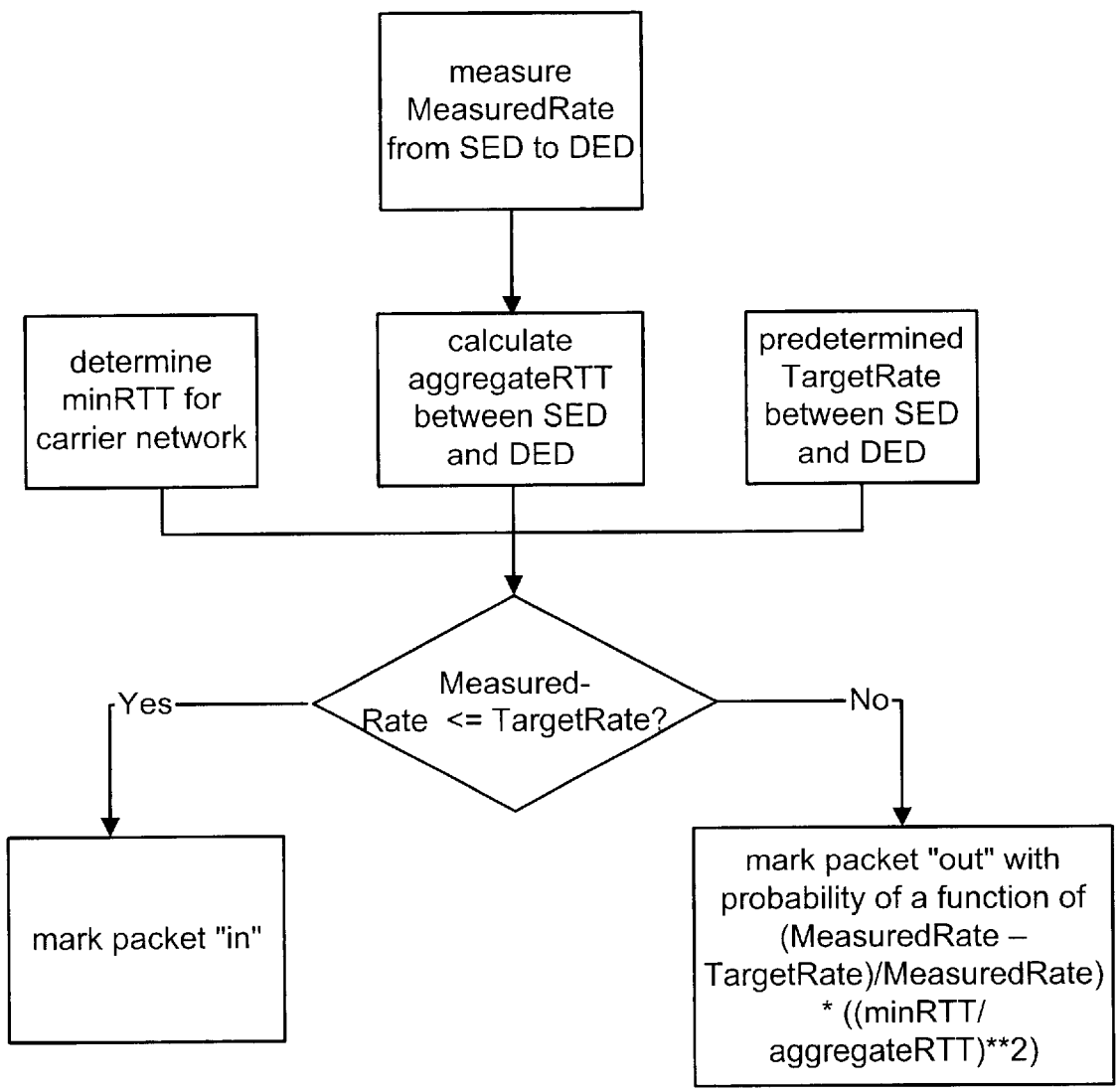
FIG. 3 is a flowchart illustrating a method in accordance with the present invention.

With reference to FIGS. 2 and 3, each source edge device includes a bandwidth estimator for measuring the rate of data flow (MeasuredRate) from the source edge device to each destination edge device associated therewith. Each source edge device also includes a round trip time estimator for estimating the round trip time (aggregateRTT) between the source edge device and each destination edge device associated therewith. Each source edge device also includes a memory element containing a predetermined target rate of data flow (TargetRate) between the source edge device and each destination edge device associated therewith. The carrier network includes an edge device communication mechanism for determining the minimum aggregateRTT (minRTT) for the carrier network. At each source edge device is a traffic conditioner. Each traffic conditioner includes an in-marker for marking a packet "in" if the MeasuredRate at the source edge device<=the TargetRate at the source edge device. Each traffic conditioner also includes out-marker for marking a packet "out" with probability of a function of ((MeasuredRate−TargetRate)/MeasuredRate)*((minRTT/ aggregateRTT)$^2$) if the MeasuredRate at the source edge device>the TargetRate at the source edge device. In the preferred embodiment, the out-marker marks a packet "out" with probability of ((MeasuredRate−TargetRate)/ MeasuredRate)*((minRTT/aggregateRTT)$^2$) if the MeasuredRate at the source edge device>the TargetRate at the source edge device.

RTT-TCs embodying the present invention may be used to mitigate the effect of disparate RTTs in the distribution of excess bandwidth among equal paying customers in certain types of over provisioned networks. Carrier networks with cross-continental or international access points will find it easiest to utilize the RTT-TC. The key services offered by such carriers to its customers would be virtual private network (VPN) like services. In such a scheme, each customer would typically access no more than a handful of other nodes in its VPN; i.e., generally in the tens or hundreds.

The service contract between the customer and the carrier is that virtual connection between specific source-destination pairs will generally have a base target rate with soft guarantees. There will also be fair sharing of the excess bandwidth amongst all customers. "Fair" implies that factors such as RTT and packet size will not bias throughput for or against particular customers.

Thus, such a network can yield significant savings over traditional "leased line" services. End-customers can contract minimal bandwidth soft guarantees with knowledge that they will compete fairly for the excess bandwidth and pay a lower rate for that portion of the bandwidth.

FIG. 1 shows a network in which customer B has four sites and Customer A has three sites. Customer A has sites that are close together while customer B has sites that have varying transmission delays. The varying distances between the sites for Customer B will result in Customer A picking up a greater share of the excess bandwidth for nodes that are oversubscribed. This is due to the RTT impact on TCP's self-clocking mechanism.

The preferred embodiment of the present invention is applicable in the following situation.

End customers contract a service agreement with a carrier network. Each customer has multiple nodes on the carrier network. Each customer site accesses the carrier network via an access point.

Service contracts between the carrier and customer consist of soft guarantees for a particular target rate between a source access point and destination access point. There is further assurance for fair competition for excess bandwidth beyond the "soft guarantee". This excess bandwidth is sold at a lesser cost.

The implication of source-destination contracts is that classification, policing and marking at the edge of the network will be on the source-destination pair for which a policy will exist locally.

Each access point has a means of tracking RTT from itself to all other access points in the network. This can either be calculated dynamically on the fly or pre-calculated and stored in a table. If there is concern that node delay can affect RTT results, then RTT must be calculated dynamically.

Across the network, there is a means of inter-accesspoint communication such that the maximum RTT (maxRTT) and minimum RTT (minRTT) in the network are determined. There is one maxRTT and one minRTT value for the whole carrier network.

At each access point, for each source-destination aggregate, the RTT is tracked to determine the aggregate RTT (aggregateRTT).

The following RTT-TC is applied:

If(measuredRate<=TargetRate)

Mark Packet "In"
Else
Mark Packet "Out" with probability:

$$\left(\frac{minRTT}{aggregateRTT}\right)^2 \times p$$

where:

$$p = \frac{(MeasuredRate - TargetRate)}{MeasuredRate}$$

The above algorithm is also illustrated in FIG. 2.

The above algorithm (FIG. 2) assists in alleviating the effects of RTT in causing biassed sharing of excess bandwidth. However, this algorithm is the general case. In the preferred embodiment, exception cases are considered in order to make the algorithm more robust.

Exception cases include those where the ratio between maxRTT and minRTT is so large that flows with large RTT hardly have any packets marked out-of-profile due to a low probability calculation.

Exception cases also include a bound for minimum and maximum RTTs to make the approach more realistic.

In addition to determining the system minimum and maximum RTTs, the more robust algorithm requires configurable values for baseRTT and maxRTTRatio:baseRTT is the minimum desired RTT in the network, and maxRTTRatio is the largest RTT ratio desired in the network.

In accordance with the preferred embodiment, values of 20 msec and 10 for baseRTT and maxRTTRatio values respectively are used. 20 msec is chosen because of results from [Fei A, Pei G, Liu R and Zhang L, "Measurements on Delay and Hop-Count of the Internet", Dept. of Computer Science, University of California]. In that paper, the authors study delays (RTT) in the Internet and show the histogram of RTTs observed. From their results, it can be gauged that there are not many RTTs below 20 msec on the Internet. 10 is chosen as the maxRTTRatio because the same paper showed that 95% of RTTs measured fell under 160 msec. 40 msec is added for buffer There are six different scenarios that the robust algorithm of the preferred embodiment seeks to address. The six scenarios are described below in the context of the robust algorithm. In implementation, the six scenarios can be reduced to four conditions for efficiency. However, in the description of the algorithm, all six scenarios are listed and described separately below.

Scenario 1 is the case where the ratio of maxRTT and minRTT is less than maxRTTRatio. This is the regular condition. In this case, packet marking is carried out in accordance with the general case algorithm (FIG. 2). If the ratio of maxRTT to minRTT is greater than maxRTTRatio then packets will be treated according to one of the following five cases. For Scenario 1, the robust algorithm is as follows:

/* Mark packet "Out" with probability */
X=maxRTTRatio

/* Regular Case */
if ((if maxRTT/minRTT)<X)
   mark packet out with probability (minRTT/aggregateRTT)$^2$*X Scenario 2 is the case where both minRTT and maxRTT are below baseRTT. In this case, transmission delays across the network are not very large. In order to bound the minRTT:maxRTT ratio, a pseudo minRTT is calculated with value maxRTT/X. All aggregateRTTs with values less than the newMinRTT have their aggregateRTT set to the value of newMinRTT. Packets are marked out of profile in accordance with the general case algorithm (FIG. 2) except that newMinRTT is substituted instead of minRTT. For Scenario 2, the robust algorithm is as follows:

/* Special Case—If both min and max RTT are below baseRTT */
Else if ((minRTT<baseRTT) and (maxRTT<baseRTT))
   NewMinRTT=maxRTT/X
   If (aggregateRTT<newMinRTT) then aggregateRTT=newMinRTT
   Mark packet "out" with probability (NewMinRTT/aggregateRTT)$^2$*p Scenario 3 is the case both minRTT and maxRTT are above baseRTT*X. In this case, transmission delays in the network are large. In this case, it is the maxRTT that needs to be bounded. Thus, a new pseudo maxRTT (newMaxRTT) is set to have the value of minRTT*X. All aggregateRTT values above newMaxRTT are reset to newMaxRTT. Packets are marked out of profile in accordance with the general case algorithm (FIG. 3). For Scenario 3, the robust algorithm is as follows:

```
/* Special Case—if both min and max RTT are above
   baseRTT*X */
Else if ((minRTT>baseRTT*X) and
   (maxRTT>baseRTT*X))
   NewMaxRTT=minRTT*X
   If (aggregateRTT>newMaxRTT) then aggregateRTT=
      newMaxRTT
   Mark packet "out" with probability (minRTT/
      aggregateRTT)²*p
```

Scenario 4 is the case where minRTT is less than the baseRTT and maxRTT is greater than baseRTT*X. This a network with widely varying RTTs. Both the min and max RTT need to be bounded, newMinRTT is set to baseRTT, newMaxRTT is set to newMinRTT*X. All aggregateRTT values above maxRTT are set to newMaxRTT while all aggregateRTT values below minRTT are set to minRTT. Packets are marked out of profile in accordance with the general case algorithm (FIG. 2) except that newMinRTT is substituted instead of minRTT. For Scenario 4, the robust algorithm is as follows:

```
/* Special Case—min less than base RTT and max greater
   than base*X */
Else if ((minRTT<baseRTT) and (maxRTT>
   (baseRTT*X)))then
   NewMinRTT=baseRTT
   NewMaxRTT=baseRTT*X
   If (aggregateRTT>newMaxRTT) then aggregateRTT=
      newMaxRTT
   If (aggregateRTT<newMinRTT) then aggregateRTT=
      newMinRTT
   Mark packet "out" with probability (newMinRTT/
      aggregateRTT)²*p
```

Scenario 5 is the case where minRTT is less than the baseRTT. At the same time, maxRTT is less than baseRTT*X but greater than baseRTT. In this case, it is the minRTT that needs to be bounded. Thus, newMinRTT is set to maxRTT/X. All aggregate RTTs less than newMinRTT are set to have values of newMinRTT. Packets are marked out of profile in accordance with the general case algorithm (FIG. 2) except that newMinRTT is substituted instead of minRTT. For Scenario 5, the robust algorithm is as follows:

```
/* Special Case */
Else if ((minRTT<baseRTT) and (maxRTT<
   (baseRTT*X)) then
   NewMinRTT—maxRTT/X
   If (aggregateRTT<newMinRTT) then aggregateRTT=
      newMinRTT
   Mark packet "out" with probability (newMinRTT/
      aggregateRTT)²*p
```

Scenario 6 is the case where minRTT is greater than baseRTT and less than baseRTT*X. At the same time, maxRTT is greater than baseRTT*X. In this case it is maxRTT that needs to be bounded. As such, newMaxRTT is set to minRTT*X. All aggregateRTT values greater than newMaxRTT are set to the value newMaxRTT. Packets are marked out of profile in accordance with the general case algorithm (FIG. 2). For Scenario 6, the robust algorithm is as follows:

```
/* Special Case */
Else if ((minRTT>baseRTT) and (maxRTT>
   (baseRTT*X))) then
   NewMaxRTT=minRTT*X
   If (aggregateRTT>newMaxRTT) then aggregateRTT=
      newMaxRTT
   Mark packet "out" with probability (minRTT/
      aggregateRTT)²*p
```

Scrutinizing the six scenarios more closely, one observes that scenarios 3 and 6 are treated in the same manner while scenarios 2 and 5 are also treated in the same way. Thus, the total number of cases is reduced to four. The conditions for the four cases are summarized below:

```
if ((maxRTT/minRTT)<X)
   [Mark packet out with probability (minRTT/
      aggregateRTT)²*X]
Else if ((minRTT<baseRTT) and (maxRTT>
   (baseRTT*X)))
   [NewMinRTT=baseRTT
   NewMaxRTT=baseRTT*X
   If (aggregateRTT>newMaxRTT) then aggregateRTT=
      newMaxRTT
   If (aggregateRTT<newMinRTT) then aggregateRTT=
      newMinRTT
   Mark packet "out" with probability (newMinRTT/
      aggregateRTT)²*p]

Else if (minRTT<baseRTT)
   [NewMinRTT=maxRTT/X
   If (aggregateRTT<newMinRTT) then aggregateRTT=
      newMinRTT
   Mark packet "out" with probability (NewMinRTT/
      aggregateRTT)²*p]

Else if (maxRTT>(baseRTT*X))
   [NewMaxRTT=minRTT*X
   If (aggregateRTT>newMaxRTT) then aggregateRTT—
      newMaxRTT
   Mark packet "out" with probability (minRTT/
      aggregateRTT)²*p
```

The actions based on the above four conditions remain the same as outlined in the previous section.

The present invention does not address issues associated with different RTTs for microflows within an aggregate and ensuring fairness for such microflows. In the context of the present invention, it is assumed that between any source-destination pair, all microflows within the aggregate will have more or less the same RTT. The present invention does not take into account RTT variation within the customer premises. It is assumed that delay times within a customer's end network is minimal relative to the transmission delay of the Wide Area Network (WAN).

While the present invention has been described in connection with what is presently considered to be the most practical and preferred embodiments, it is to be understood that the invention is not limited to the disclosed embodiments. To the contrary, the present invention is intended to cover various modifications, variations, adaptations and equivalent arrangements included within the spirit and the scope of the appended claims. The scope of the claims is to be accorded the broadest interpretation so as to encompass all such modifications and equivalent structures and functions.

What is claimed is:

1. A carrier network comprising:
   a. at least one virtual private network, each virtual private network comprising a plurality of edge devices;

b. at least one core device for routing data between edge devices within a virtual private network;
c. each plurality of edge devices comprising:
   i. at least one source edge device; and
   ii. at least one destination edge device associated with each source edge device;
d. each source edge device comprising:
   i. means for estimating the rate of data flow (MeasuredRate) from the source edge device to each destination edge device associated therewith;
   ii. means for estimating the round trip time (aggregateRTT) between the source edge device and each destination edge device associated therewith; and
   iii. a memory element containing a predetermined target rate of data flow (TargetRate) between the source edge device and each destination edge device associated therewith;
e. edge device communication means for determining the minimum aggregateRTT (minRTT) for the carrier network;
f. a traffic conditioner at each source edge device comprising:
   i. in-marking means for marking a packet "in" if the MeasuredRate at the source edge device<=the TargetRate at the source edge device; and
   ii. out-marking means for marking a packet "out" with probability of a function of ((MeasuredRate−TargetRate)/MeasuredRate)*((minRTT/aggregateRTT)$^2$) if the MeasuredRate at the source edge device>the TargetRate at the source edge device.

2. A carrier network as defined in claim 1, wherein the aggregateRTT is calculated dynamically on the fly.

3. A carrier network as defined in claim 1, wherein the aggregateRTT is pre-calculated and stored in a table.

4. A carrier network as defined in claim 1, further comprising second edge device communication means for determining the maximum aggregateRTT (maxRTT) for the carrier network.

5. A carrier network as defined in claim 1, comprising a plurality of virtual private network, each virtual private network comprising a plurality of edge devices.

6. A carrier network as defined in claim 1, wherein the out-marking means marks a packet "out" with probability of ((MeasuredRate−TargetRate)/MeasuredRate)*((minRTT/aggregateRTT)$^2$) if the MeasuredRate at the source edge device>the TargetRate at the source edge device.

7. A virtual private network for use in a carrier network, the carrier network comprising at least one core device for routing data between edge devices on the carrier network, and edge device communication means for determining the minimum aggregateRTT (minRTT) for the carrier network, the virtual private network comprising:
   a. at least one source edge device;
   b. at least one destination edge device associated with each source edge device;
   c. means at each source edge device for estimating the rate of data flow (MeasuredRate) from the source edge device to each destination edge device associated therewith;
   d. means at each source edge device for estimating the round trip time (aggregateRTT) between the source edge device and each destination edge device associated therewith;
   e. a memory element at each source edge device containing a predetermined target rate of data flow (TargetRate) between the source edge device and each destination edge device associated therewith;
   f. a traffic conditioner at each source edge device comprising:
      i. in-marking means for marking a packet "in" if the MeasuredRate at the source edge device<=the TargetRate at the source edge device; and
      ii. out-marking means for marking a packet "out" with probability of a function of ((MeasuredRate−TargetRate)/MeasuredRate)*((minRTT/aggregateRTT)$^2$) if the MeasuredRate at the source edge device>the TargetRate at the source edge device.

8. A source edge device for use in a carrier network, the carrier network comprising:
   a. at least one virtual private network, each virtual private network comprising a plurality of edge devices;
   b. at least one core device for routing data between edge devices within the virtual private network;
   c. each plurality of edge devices comprising:
      i. at least one source edge device; and
      ii. at least one destination edge device associated with each source edge device;
   d. edge device communication means for determining the minimum aggregateRTT (minRTT) for the carrier network;
the source edge device comprising:
   e. means for estimating the rate of data flow (MeasuredRate) from the source edge device to each destination edge device associated therewith;
   f. means for estimating the round trip time (aggregateRTT) between the source edge device and each destination edge device associated therewith;
   g. a memory element containing a predetermined target rate of data flow (TargetRate) between the source edge device and each destination edge device associated therewith; and
   h. a traffic conditioner comprising:
      i. in-marking means for marking a packet "in" if the MeasuredRate at the source edge device<=the TargetRate at the source edge device; and
      ii. out-marking means for marking a packet "out" with probability of a function of ((MeasuredRate−TargetRate)/MeasuredRate)*((minRTT/aggregateRTT)$^2$) if the MeasuredRate at the source edge device>the TargetRate at the source edge device.

9. A traffic conditioner for use in a source edge device in a carrier network, the carrier network comprising:
   a. at least one virtual private network, each virtual private network comprising a plurality of edge devices;
   b. at least one core device for routing data between edge devices within the virtual private network;
   c. each plurality of edge devices comprising:
      i. at least one source edge device; and
      ii. at least one destination edge device associated with each source edge device;
   d. edge device communication means for determining the minimum aggregateRTT (minRTT) for the carrier network;
   e. the source edge device comprising:
      i. means for estimating the rate of data flow (MeasuredRate) from the source edge device to each destination edge device associated therewith;
      ii. means for estimating the round trip time (aggregateRTT) between the source edge device and each destination edge device associated therewith; and iii. a memory element containing a predetermined target rate of data flow (TargetRate) between the source edge device and each destination edge device associated therewith;

the traffic conditioner comprising:

f. in-marking means for marking a packet "in" if the MeasuredRate at the source edge device<=the TargetRate at the source edge device; and g. out-marking means for marking a packet "out" with probability of a function of ((MeasuredRate−TargetRate)/MeasuredRate)*((minRTT/aggregateRTT)$^2$) if the MeasuredRate at the source edge device>the TargetRate at the source edge device.

10. A carrier network comprising:

a. at least one virtual private network, each virtual private network comprising a plurality of edge devices;

b. at least one core device for routing data between edge devices within a virtual private network;

c. each plurality of edge devices comprising:
i. at least one source edge device; and
ii. at least one destination edge device associated with each source edge device;

d. each source edge device comprising:
i. a bandwidth estimator for estimating the rate of data flow (MeasuredRate) from the source edge device to each destination edge device associated therewith;
ii. a round trip time estimator for estimating the round trip time (aggregateRTT) between the source edge device and each destination edge device associated therewith; and
iii. a memory element containing a predetermined target rate of data flow (TargetRate) between the source edge device and each destination edge device associated therewith;

e. an edge device communication mechanism for determining the minimum aggregateRTT (minRTT) for the carrier network;

f. a traffic conditioner at each source edge device comprising:
i. an in-marker for marking a packet "in" if the MeasuredRate at the source edge device<=the TargetRate at the source edge device; and
ii. an out-marker for marking a packet "out" with probability of a function of ((MeasuredRate−TargetRate)/MeasuredRate)*((minRTT/aggregateRTT)$^2$) if the MeasuredRate at the source edge device>the TargetRate at the source edge device.

11. A traffic conditioning method for use in a source edge device in a carrier network, the carrier network comprising:

a. at least one virtual private network, each virtual private network comprising a plurality of edge devices;

b. at least one core device for routing data between edge devices within the virtual private networks;

c. each plurality of edge devices comprising:
i. at least one source edge device; and
ii. at least one destination edge device associated with each source edge device;

d. edge device communication means for determining the minimum aggregateRTT (minRTT) for the carrier network;

e. the source edge device comprising:
i. means for estimating the rate of data flow (MeasuredRate) from the source edge device to each destination edge device associated therewith;
ii. means for estimating the round trip time (aggregateRTT) between the source edge device and each destination edge device associated therewith; and
iii. a memory element containing a predetermined target rate of data flow (TargetRate) between the source edge device and each destination edge device associated therewith;

the traffic conditioning method comprising the steps of:

A. marking a packet "in" if the MeasuredRate at the source edge device<=the TargetRate at the source edge device; and B. marking a packet "out" with probability of a function of ((MeasuredRate−TargetRate)/MeasuredRate)*((minRTT/aggregateRTT)$^2$) if the MeasuredRate at the source edge device>the TargetRate at the source edge device.

12. A traffic conditioning method as defined in claim 11, wherein step B comprises the step of:

B. marking a packet "out" with probability of ((MeasuredRate−TargetRate)/MeasuredRate)*((minRTT/aggregateRTT)$^2$) if the MeasuredRate at the source edge device>the TargetRate at the source edge device.

13. A traffic conditioning method as defined in claim 11, wherein step B comprises the steps of:

I. setting maxRTTRatio equal to a first predetermined value;

II. setting baseRTT equal to a second predetermined value;

III. if ((maxRTT/minRTT)<maxRTTRatio)
mark packet out with probability (minRTT/aggregateRTT)$^2$*maxRTTRatio.

14. A traffic conditioning method as defined in claim 11, wherein step B comprises the steps of:

I. setting maxRTTRatio equal to a first predetermined value;

II. setting baseRTT equal to a second predetermined value;

III. if ((minRTT<baseRTT) and (maxRTT<baseRTT))
NewMinRTT=maxRTT/maxRTTRatio
If (aggregateRTT<newMinRTT) then aggregateRTT=newMinRTT
mark packet "out" with probability (NewMinRTT/aggregateRTT)$^2$*((MeasuredRate−TargetRate)/Measured Rate).

15. A traffic conditioning method as defined in claim 11, wherein step B comprises the steps of:

I. setting maxRTTRatio equal to a first predetermined value;

II. setting baseRTT equal to a second predetermined value;

III. Else if ((minRTT>baseRTT*maxRTTRatio) and (maxRTT>baseRTT*maxRTTRatio)) then
NewMaxRTT=minRTT*maxRTTRatio
If (aggregateRTT>newMaxRTT) then aggregateRTT=newMaxRTT
mark packet "out" with probability (minRTT/aggregateRTT)$^2$*((MeasuredRate−TargetRate)/Measured Rate).

16. A traffic conditioning method as defined in claim 11, wherein step B comprises the steps of:

I. setting maxRTTRatio equal to a first predetermined value;

II. setting baseRTT equal to a second predetermined value;

III. if ((minRTT<baseRTT) and (maxRTT> (baseRTT*maxRTTRatio))) then
NewMinRTT=baseRTT
NewMaxRTT=baseRTT*maxRTTRatio
  If (aggregateRTT>newMaxRTT) then aggregateRTT= newMaxRTT
  If (aggregateRTT<newMinRTT) then aggregateRTT= newMinRTT
  Mark packet "out" with probability (newMinRTT/ aggregateRTT)$^2$*((MeasuredRate−TargetRate)/ Measured Rate).

17. A traffic conditioning method as defined in claim 11, wherein step B comprises the steps of:
  I. setting maxRTTRatio equal to a first predetermined value;
  II. setting baseRTT equal to a second predetermined value;
  III. if ((minRTT<baseRTT) and (maxRTT< (baseRTT*maxRTTRatio)) then
  NewMinRTT=maxRTT/maxRTTRatio
    If (aggregateRTT<newMinRTT) then aggregateRTT= newMinRTT
    mark packet "out" with probability (newMinRTT/ aggregateRTT)$^2$*((MeasuredRate−TargetRate)/ Measured Rate).

18. A traffic conditioning method as defined in claim 11, wherein step B comprises the steps of:
  I. setting maxRTTRatio equal to a first predetermined value;
  II. setting baseRTT equal to a second predetermined value;
  III. if ((minRTT>baseRTT) and (maxRTT> (baseRTT*maxRTTRatio))) then
  NewMaxRTT=minRTT*maxRTTRatio
    If (aggregateRTT>newMaxRTT) then aggregateRTT= newMaxRTT
    Mark packet "out" with probability (minRTT/ aggregateRTT)$^2$*((MeasuredRate−TargetRate)/ Measured Rate).

19. A traffic conditioning method as defined in claim 11, wherein step B comprises the steps of:
  I. setting maxRTTRatio equal to a first predetermined value;
  II. setting baseRTT equal to a second predetermined value;
  III. if ((maxRTT/minRTT)<maxRTTRatio)
    mark packet out with probability (minRTT/ aggregateRTT)$^2$*maxRTTRatio
  IV. if ((minRTT<baseRTT) and (maxRTT<baseRTT)) then
  NewMinRTT=maxRTT/X
    If (aggregateRTT<newMinRTT) then aggregateRTT= newMinRTT
    Mark packet "out" with probability (NewMinRTT/ aggregateRTT)
  V. Else if ((minRTT>baseRTT*X) and (maxRTT>baseRTT*maxRTTRatio))
  NewMaxRTT=minRTT*maxRTTRatio
    If (aggregateRTT>newMaxRTT) then aggregateRTT= newMaxRTT
    Mark packet "out" with probability (minRTT/ aggregateRTT)
  VI. if ((minRTT<baseRTT) and (maxRTT> (baseRTT*maxRTTRatio))) then
  NewMinRTT=baseRTT
  NewMaxRTT=baseRTT*maxRTTRatio
    If (aggregateRTT>newMaxRTT) then aggregateRTT= newMaxRTT
    If (aggregateRTT<newMinRTT) then aggregateRTT= newMinRTT
    Mark packet "out" with probability (newMinRTT/ aggregateRTT)
  VII. if ((minRTT<baseRTT) and (maxRTT< (baseRTT*maxRTTRatio)) then
  NewMinRTT=maxRTT/maxRTTRatio
    If (aggregateRTT<newMinRTT) then aggregateRTT= newMinRTT
    Mark packet "out" with probability (newMinRTT/ aggregateRTT)
  VIII. if ((minRTT>baseRTT) and (maxRTT> (baseRTT*maxRTTRatio))) then
  NewMaxRTT=minRTT*maxRTTRatio
    If (aggregateRTT>newMaxRTT) then aggregateRTT= newMaxRTT
    Mark packet "out" with probability (minRTT/ aggregateRTT)$^2$*((MeasuredRate−TargetRate)/ Measured Rate).

20. A traffic conditioning method as defined in claim 11, wherein step B comprises the steps of:
  I. setting maxRTTRatio equal to a first predetermined value;
  II. setting baseRTT equal to a second predetermined value;
  III. if ((maxRTT/minRTT)<maxRTTRatio)
    mark packet out with probability (minRTT/ aggregateRTT)$^2$*maxRTTRatio
    Else if ((minRTT<baseRTT) and (maxRTT> (baseRTT*maxRTTRatio)))
    NewMinRTT=baseRTT
    NewMaxRTT=baseRTT*maxRTTRatio
      If (aggregateRTT>newMaxRTT) then aggregateRTT= newMaxRTT
      If (aggregateRTT<newMinRTT) then aggregateRTT= newMinRTT
      Mark packet "out" with probability (newMinRTT/ aggregateRTT)$^2$*((MeasuredRate−TargetRate)/ Measured Rate)
    Else if (minRTT<baseRTT)
    NewMinRTT=maxRTT/maxRTTRatio
      If (aggregateRTT<newMinRTT) then aggregateRTT= newMinRTT
      Mark packet "out" with probability (NewMinRTT/ aggregateRTT)$^2$*((MeasuredRate−TargetRate)/ Measured Rate)
    Else if (maxRTT>(baseRTT*maxRTTRatio))
    NewMaxRTT=minRTT*maxRTTRatio
      If (aggregateRTT>newMaxRTT) then aggregateRTT= newMaxRTT
      Mark packet "out" with probability (minRTT/ aggregateRTT)$^2$*((MeasuredRate−TargetRate)/ Measured Rate).

21. A computer executable software code stored on a computer readable medium, the code for use in a source edge device in a carrier network, the carrier network comprising:
  a. at least one virtual private network, each virtual private network comprising a plurality of edge devices;
  b. at least one core device for routing data between edge devices within the virtual private networks;
  c. each plurality of edge devices comprising:

i. at least one source edge device; and
ii. at least one destination edge device associated with each source edge device;
d. edge device communication means for determining the minimum aggregateRTT (minRTT) for the carrier network;
e. the source edge device comprising:
i. means for estimating the rate of data flow (MeasuredRate) from the source edge device to each destination edge device associated therewith;
ii. means for estimating the round trip time (aggregateRTT) between the source edge device and each destination edge device associated therewith; and
iii. a memory element containing a predetermined target rate of data flow (TargetRate) between the source edge device and each destination edge device associated therewith;

the code comprising:
A. code to mark a packet "in" if the MeasuredRate at the source edge device<=the TargetRate at the source edge device; and
B. code mark a packet "out" with probability of a function of ((MeasuredRate−TargetRate)/MeasuredRate)*((minRTT/aggregateRTT)$^2$) if the MeasuredRate at the source edge device>the TargetRate at the source edge device.

22. A programmed computer for use in a source edge device in a carrier network, the carrier network comprising:
a. at least one virtual private network, each virtual private network comprising a plurality of edge devices;
b. at least one core device for routing data between edge devices within the virtual private network;
c. each plurality of edge devices comprising:
i. at least one source edge device; and
ii. at least one destination edge device associated with each source edge device;
d. edge device communication means for determining the minimum aggregateRTT (minRTT) for the carrier network;
e. the source edge device comprising:
i. means for estimating the rate of data flow (MeasuredRate) from the source edge device to each destination edge device associated therewith;
ii. means for estimating the round trip time (aggregateRTT) between the source edge device and each destination edge device associated therewith; and
iii. a memory element containing a predetermined target rate of data flow (TargetRate) between the source edge device and each destination edge device associated therewith;

the programmed computer comprising:
a. a memory having at least one region for storing computer executable program code; and
b. a processor for executing the program code stored in the memory;
c. wherein the program code includes:
A. code to mark a packet "in" if the MeasuredRate at the source edge device<=the TargetRate at the source edge device; and
B. code mark a packet "out" with probability of a function of ((MeasuredRate−TargetRate)/MeasuredRate)*((minRTT/aggregateRTT)$^2$) if the MeasuredRate at the source edge device>the TargetRate at the source edge device.

23. A computer readable medium having a computer executable software code stored thereon, the code for use in a source edge device in a carrier network, the carrier network comprising:
a. at least one virtual private network, each virtual private network comprising a plurality of edge devices;
b. at least one core device for routing data between edge devices within the virtual private network;
c. each plurality of edge devices comprising:
i. at least one source edge device; and
ii. at least one destination edge device associated with each source edge device;
d. edge device communication means for determining the minimum aggregateRTT (minRTT) for the carrier network;
e. the source edge device comprising:
i. means for estimating the rate of data flow (MeasuredRate) from the source edge device to each destination edge device associated therewith;
ii. means for estimating the round trip time (aggregateRTT) between the source edge device and each destination edge device associated therewith; and
iii. a memory element containing a predetermined target rate of data flow (TargetRate) between the source edge device and each destination edge device associated therewith;

the computer readable medium comprising:
A. code to mark a packet "in" if the MeasuredRate at the source edge device<=the TargetRate at the source edge device; and
B. code mark a packet "out" with probability of a function of ((MeasuredRate−TargetRate)/MeasuredRate)*((minRTT/aggregateRTT)$^2$) if the MeasuredRate at the source edge device>the TargetRate at the source edge device.

24. A computer data signal embodied in a carrier wave comprising, for use in a source edge device in a carrier network, the carrier network comprising:
a. at least one virtual private network, each virtual private network comprising a plurality of edge devices;
b. at least one core device for routing data between edge devices within the virtual private networks;
c. each plurality of edge devices comprising:
i. at least one source edge device; and
ii. at least one destination edge device associated with each source edge device;
d. edge device communication means for determining the minimum aggregateRTT (minRTT) for the carrier network;
e. the source edge device comprising:
i. means for estimating the rate of data flow (MeasuredRate) from the source edge device to each destination edge device associated therewith;
ii. means for estimating the round trip time (aggregateRTT) between the source edge device and each destination edge device associated therewith; and
iii. a memory element containing a predetermined target rate of data flow (TargetRate) between the source edge device and each destination edge device associated therewith;

the computer data signal comprising:

A. code to mark a packet "in" if the MeasuredRate at the source edge device<=the TargetRate at the source edge device; and
B. code mark a packet "out" with probability of a function of ((MeasuredRate−TargetRate)/MeasuredRate)* $((minRTT/aggregateRTT)^2)$ if the MeasuredRate at the source edge device>the TargetRate at the source edge device.

* * * * *